United States Patent [19]

Dietrich et al.

[11] Patent Number: 4,674,075
[45] Date of Patent: Jun. 16, 1987

[54] CARDAN SUSPENSION FOR MICROPHONES FOR SOUND RANGING IN WATER

[75] Inventors: Albert Dietrich, Markdorf; Peter Katz, Friedrichshafen; Josef Vincken, Weitersburg, all of Fed. Rep. of Germany

[73] Assignee: Dornier GmbH, Friedrichshafen, Fed. Rep. of Germany

[21] Appl. No.: 308,189

[22] Filed: Sep. 22, 1981

[30] Foreign Application Priority Data

Sep. 20, 1980 [DE] Fed. Rep. of Germany ....... 3035544

[51] Int. Cl.$^4$ .......................................... H04R 17/00
[52] U.S. Cl. ................................. 367/173; 367/141; 367/165; 367/153
[58] Field of Search ................... 174/83, 86; 367/153, 367/12, 155, 156, 165, 173, 141

[56] References Cited

U.S. PATENT DOCUMENTS

| | | | |
|---|---|---|---|
| 1,279,807 | 9/1918 | White | 174/86 |
| 2,646,950 | 7/1953 | Nelson et al. | 367/173 |
| 3,027,539 | 3/1962 | Stillman, Jr. | 367/173 |
| 3,518,676 | 6/1970 | Kirknes | 367/173 |
| 4,015,233 | 3/1977 | Laurent et al. | 367/155 |
| 4,017,824 | 4/1977 | Fife et al. | 367/155 |
| 4,144,518 | 3/1979 | Minohara et al. | 367/12 |
| 4,282,590 | 8/1981 | Wingate | 367/173 |

Primary Examiner—Harold J. Tudor
Attorney, Agent, or Firm—Burns, Doane, Swecker & Mathis

[57] ABSTRACT

A hydrophone comprises a microphone pivotally mounted on each end of a gimballed tube. A coiled cable connects each microphone with a housing for a receiver. A tube having an external diameter equal to the inside diameter of the cable coil is inserted partially into the coil. The end of the cable is threaded through a lateral hole in the tube and through the interior of the tube into engagement with the microphone or the housing, as the case may be.

4 Claims, 4 Drawing Figures

CARDAN SUSPENSION FOR MICROPHONES FOR SOUND RANGING IN WATER

The invention concerns a Cardan suspension for microphones for sound ranging (acoustic measurement) in water (hydrophones) of the type having a Cardan ring, which is attached a housing and to a journal attached to the Cardan ring.

For the sound-ranging (acoustic measurement) of sea mines, hydrophones are used, which are arranged vertically above one another at a specified interval, whereby the following requirements are stipulated:

in the horizontal position, referenced to the longitudinal axis of the mine, the two hydrophones must always be capable of being adjusted vertically relative to the surface of the water and the deviation from the vertical may not be more than ±1°;

the interval between the hydrophones must always remain constant.

These two characteristics must also be insured and sustained when the mine rotates around its own axis and/or when the tilt angle of the longitudinal axis of the mine is in the range of ±30°.

The object of the invention is to make the electrical connection between the microphones and the housing water-tight to sea water and therefore to eliminate the need for a slip ring in uni-directional multiple rotations around the longitudinal axis of the mine.

This objective is realized by the invention by the fact that on each end of the tube a microphone is mounted on a pivot and by the fact that a coiled cable is provided for signal transmission from the microphone to the housing. Preferably, the cable terminals both on the microphones and on the housing are concentrically arranged, as an coaxial cables, whereby a tube, whose external diameter is equal to the inside diameter of the cable coil, is inserted to a depth of about two windings into the coiled cable coil and engages the cable through a hole on the circumference, whereby it coincidentally serves to fasten the cable in the housing.

The microphones are mounted pivotally at the ends of the Cardan-suspended tubes, so that during a rotation of the tube around the longitudinal axis of the mine the cables inserted in the tube and the Cardan (gimbal) component cannot be twisted out or separated. Transient torsions and torques are eliminated in the mounting of the microphones. Only a residual torque moment remains, which is contingent upon the bearing friction of the bearing of the microphones. In this process, the cable experiences merely a turning around its central axis with coincidental bending stress. This bearing-friction moment and the moment from the bending of the cable generate, together with the Cardan bearing friction, a moment, which causes the deviation of the tube from the vertical position. However, the tube is provided with a ballast weight at one end, so that the vertical position of the microphones one above the other is always definitely maintained and the moment generated by the friction is essentially compensated.

In order to keep the counter-moment as small as possible, particular attention must be accorded to the flexibility of the cable. Therefore, it is based upon a coiled cable of the type used with telephones, in which the ends are arranged concentrically. This is effected by means of a tube, whose external diameter is equal to the inside diameter of the coiled cable and which receives the end of the cable through a lateral hole. In this manner a pivotable end position of the cable around this axis is obtained both for the microphone and the housing.

Additional advantages, characteristics and application possibilities of the invention are illustrated by the FIGS., which are described hereafter.

Figure 1:
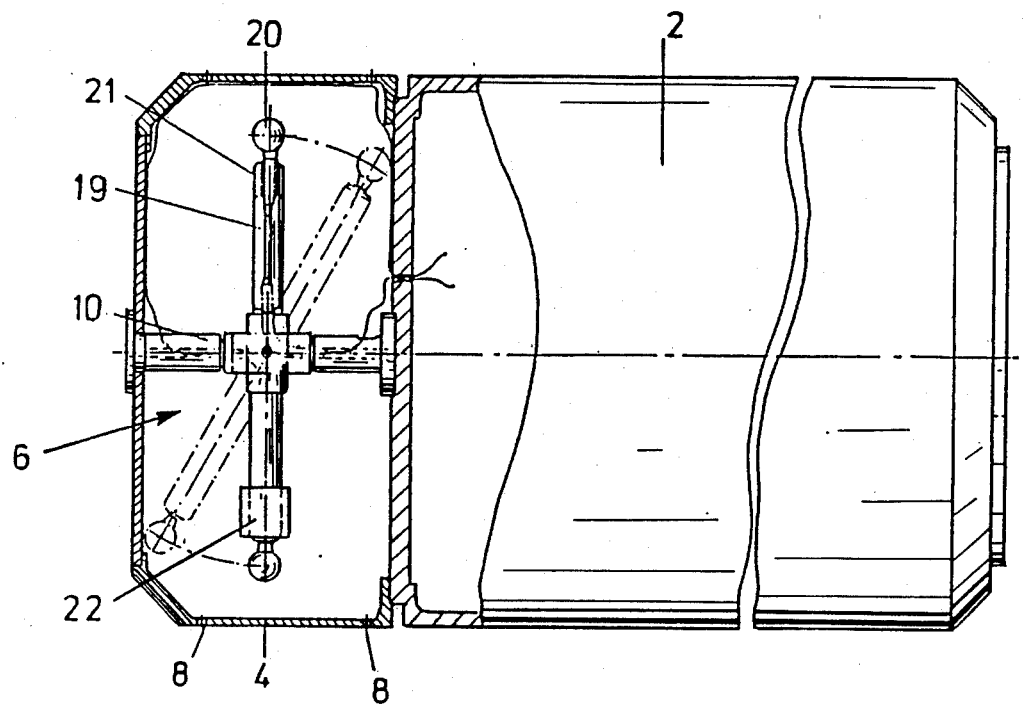
FIG. 1 shows in basic presentation a sea ground mine with Cardan suspension for microphones for sound ranging in water.

FIG. 1 shows in basic presentation a sea ground mine 2, on which a housing 4 is flange-mounted to receive the hydrophone configuration 6 according to the invention. The housing 4 is connected through the holes 8 with its adjacent components and is normally filled with salt water after the mine has been launched. However, there can also be a conjugate fluid in housing 4, if there are no holes or if the holes have been sealed. On the walls of the housing flanged pipes 10 are attached, in whose holes 12 the journals 14 of a Cardan ring 16 are supported (see FIG. 3).

Figure 3:
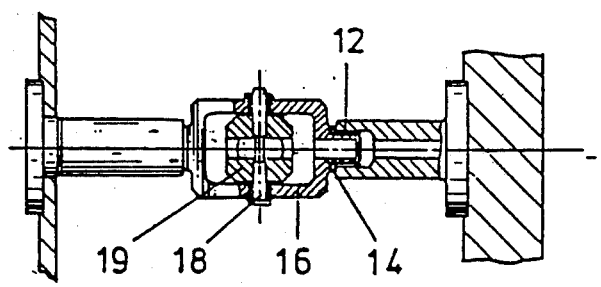
FIG. 3 shows the section view A—A of FIG. 2.
Figure 2:
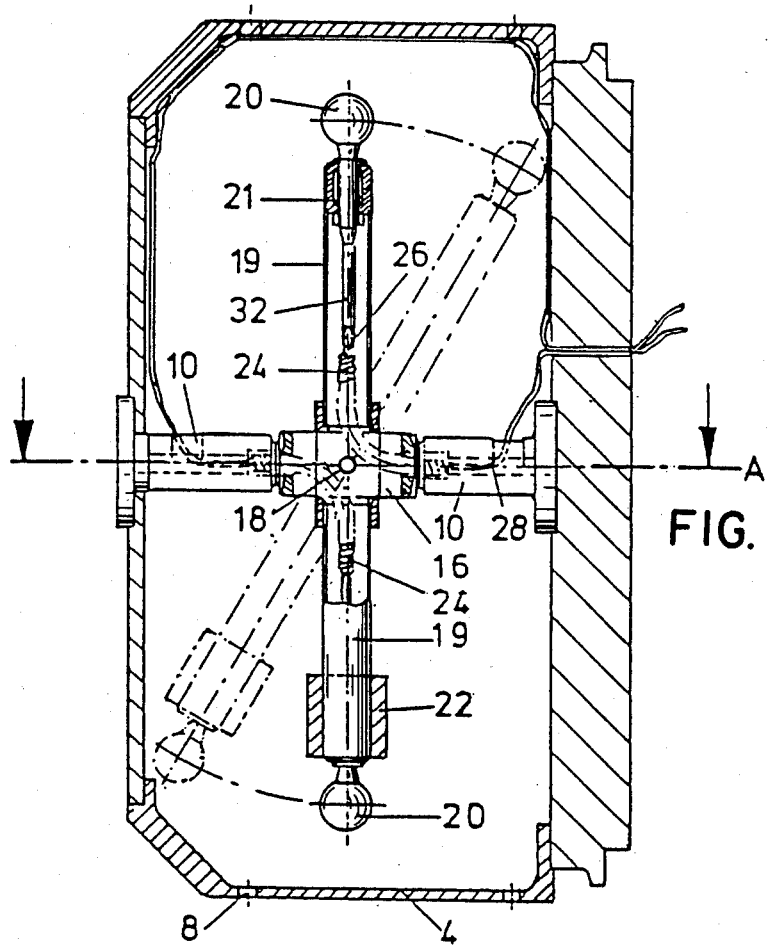
FIG. 2 shows a section view through the Cardan suspension of FIG. 1.

As can be clearly noted in FIG. 3, a shaft 18 is mounted pivotally in the Cardan (gimbal) ring, whereby the shaft is attached rigidly to tube 19. At the end of each tube 19 a microphone 20 is mounted on a pivot by means of sliding bearings.

The hydrophone configuration 6 is mobile within a specific angular degree by means of the Cardan suspension in the housing 4—an extended position is indicated with a dashed line—and by means of a ballast weight 22, which is on tube 19, is always maintained in the vertical position.

The present invention is particularly directed to the cable routing between the microphones 20 and the sea ground mine It consists of a coiled cable 24 of the telephone cable type in the vicinity of the Cardan ring 16. The ends 28 of the cable are each disposed concentrically within the holes of tubes 26, whereby the cable ends are respectively connected with the microphones and an hypothetical signal receiver which is not illustrated.

Figure 4:
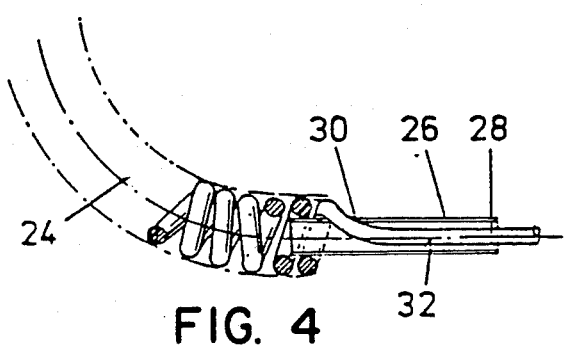
FIG. 4 shows a detail view of the cable connection.

As can be noted in FIG. 4, the tube 26 is inserted to a depth of about 2 windings in the cable coil, whereby an opening 30 on the circumference of the tube 26 receives the cable and leads it in its hole 26 concentrically to the microphine 20 and housing 4; in this manner an uninhibited turning of the cable around its central axis 32 is obtained.

Tests have confirmed that with this type of cable routing only very minor moments are exerted upon the hydrophone arrangement and that this configuration can assume its vertical position exactly.

We claim:

1. A Cardan suspenison hydrophone arrangement, comprising:
   a housing;
   a Cardan ring attached to and pivotable relative to said housing about a first axis;
   a shaft attached to said Cardan ring;
   a support tube attached to said shaft for pivotable movement about a second axis that is defined by said shaft and is perpendicular to said first axis;
   a pair of microphones respectively disposed on opposite ends of said support tube, said microphones being pivotable about an axis concentric with said support tube; and a pair of coiled cable, each of said cables being at least partially disposed in said support tube and having one end connected to one of said microphones and an other end operatively connected to transmit signals from said microphone to said housing.

2. The hydrophone arrangement of claim 1, wherein the terminals at each end of each of said cables are concentrically arranged with respect to one another.

3. The hydrophone arrangement of claim 1, further including a guide tube disposed within said support tube, said guide tube having a lateral hole on the circumference thereof, said guide tube and one of said coiled cables being arranged relative to one another such that said guide tube is partially inserted within said cable and the portion of the cable adjacent the end of said cable wich is attached to the microphone passes through said lateral hole and through the interior of said guide tube to said microphone.

4. The hydrophone arrangement of claim 3, further including a second guide tube disposed adjacent the other end of said cable, said second guide tube being partially inserted within said cable and the portion of the cable adjacent the other end of the cable passing through a lateral hole in said second guide tube and passing through said second guide tube into operative relationship with said housing.

* * * * *